Figure 1:
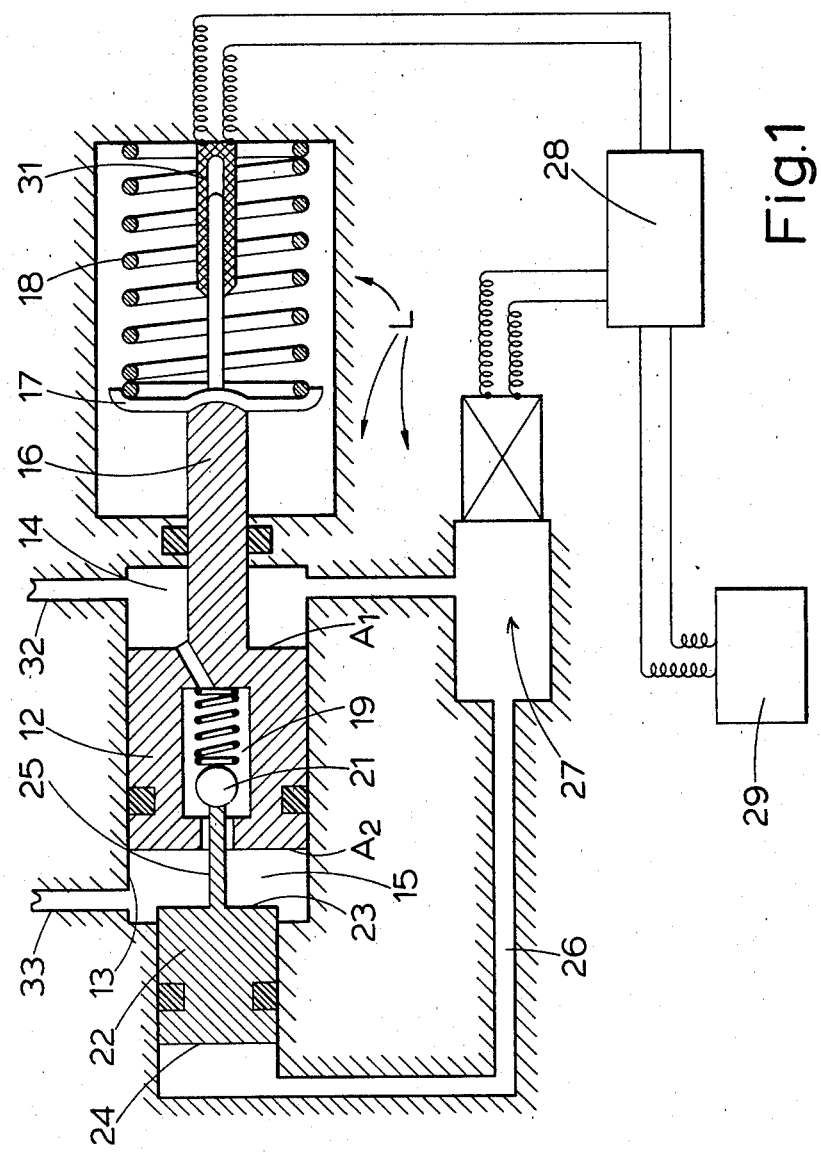

United States Patent [19]
Young

[11] 4,358,163
[45] Nov. 9, 1982

[54] BRAKE PRESSURE MODULATING VALVE

[75] Inventor: Alastair J. Young, Kenilworth, England

[73] Assignee: Automotive Products Limited, Leamington Spa, England

[21] Appl. No.: 215,512

[22] Filed: Dec. 11, 1980

[30] Foreign Application Priority Data

Dec. 14, 1979 [GB] United Kingdom .................. 7943237

[51] Int. Cl.³ .............................................. B60T 8/18
[52] U.S. Cl. .................................... 303/22 R; 303/15
[58] Field of Search ...................... 303/22 R, 22 A, 23, 303/6 C, 6 R, 24, 3, 100, 115, 119, 15, 61, 89, DIG. 1; 188/195, 349, 181; 251/134

[56] References Cited
U.S. PATENT DOCUMENTS 3,276,822 10/1966 Lister et al. ....................... 303/24 F
3,729,237 4/1973 Ishikawa et al. ................ 303/6 C X
3,981,543 9/1976 Atkins ............................... 303/115 X
4,289,358 9/1981 Dufft et al. ......................... 303/22 R

FOREIGN PATENT DOCUMENTS 1479797 7/1977 United Kingdom .
1555667 11/1979 United Kingdom .

*Primary Examiner*—Douglas C. Butler
*Attorney, Agent, or Firm*—Kemon & Estabrook

[57] ABSTRACT

A vehicle brake system fluid modulating valve has a main piston acted upon by a control spring and master cylinder pressure on one hand and an opposing brake system on the other hand. A slave piston is also acted upon by the master cylinder pressure, and is arranged to control an operating point at which the main piston effects brake pressure modulation. This control is effected by cutting off the master cylinder pressure to the slave piston when the operating point is reached. Electrical transducers sense vehicle load and master cylinder pressure, respectively, and their output signals are processed by a comparator for consequential operation of the valve to cut-off the master cylinder pressure to the slave piston. The operating point is altered by balancing the master cylinder pressure signal in response to changes in the vehicle load signal.

5 Claims, 2 Drawing Figures

BRAKE PRESSURE MODULATING VALVE

This invention relates to vehicle brake system fluid pressure modulating valves and in particular, but not exclusively, to pressure reducing valves.

Pressure reducing valves are commonly fitted to the hydraulic brake system of motor vehicles and are located between the hydraulic master cylinder and the rear brakes. These reducing valves operate to ensure that on application of the brakes, once a predetermined master cylinder pressure has been reached, the rate of increase in pressure to the rear brakes is less than the rate of increase in pressure in the master cylinder and hence the front brakes. The point at which the valve begins to operate to modulate the pressure in the rear brakes will be called the operating point.

Pressure reducing valves can be made sensitive to the vehicle load so that the operating point varies according to the load on the vehicle, for example, if the load on the vehicle is increased then the predetermined pressure at which the valve begins to operate is also increased. The normal method for making a reducing valve sensitive to vehicle load is to follow the collapse of the vehicle suspension through a system of springs and levers, for example as shown in our British Pat. No. 1,555,667. A problem associated with this type of load sensitive reducing valve is that the various springs have to be set up correctly in the factory and that subsequent tampering with a spring setting can make the valve operate at an incorrect operating point.

The reducing valve can also be made sensitive to changes in the load on the vehicle suspension caused by rapid deceleration. This is accomplished by having an inertia sensitive member, for example, a ball bearing, which can shut off or by-pass the flow of hydraulic fluid around the reducing valve once a predetermined change of inertia has been exceeded, thereafter causing all fluid to pass through the reducing valve to modulate the pressure to the rear brakes. Such a valve is shown in British Pat. No. 1,479,797.

The object of the present invention is to provide a pressure modulating valve which is sensitive to a load on the vehicle and which does not rely on mechanical methods to change the operating point at which the valve begins to modulate the pressure to the rear brakes.

Accordingly there is provided a vehicle brake system fluid pressure modulating valve having a main piston to effect pressure modulation and which is responsive to the net load exerted thereon by a control spring, and master cylinder pressure on one hand and an opposing brake system pressure on the other hand and a slave piston also responsive to master cylinder pressure and which controls an operating point at which the main piston begins to effect said modulation, there being in association with the modulating valve, electrical transducers sensitive to the effect of master cylinder pressure and to a load on the vehicle respectively, and a means for combining the transducer output signals for consequential operation of a cut-off valve to cut-off the master cylinder pressure to the slave piston when the operating point is reached, the operating point being controlled by the relationship between the two transducer signals.

By the term "load on the vehicle" is meant not only the load which the vehicle carries but also inertia loads generated by changes in momentum.

Preferably the slave piston is also responsive to the brake system pressure and is arranged in tandem with the main piston, said main piston having a passageway there through connecting the master cylinder and brake pressure sides of the main piston. The flow of fluid through the passageway is controlled by a non-return valve which is held open by the slave piston until the master cylinder pressure to the slave piston is cut off, thereby locking the slave piston in position and consequently allowing the non-return valve to close and the modulation to begin.

Conveniently the transducer sensing the load on the vehicle is an accelerometer, or alternatively is a load cell attached to the vehicle suspension, or a proximity transducer sensing movement of a load sensitive suspension member.

Figure 2:
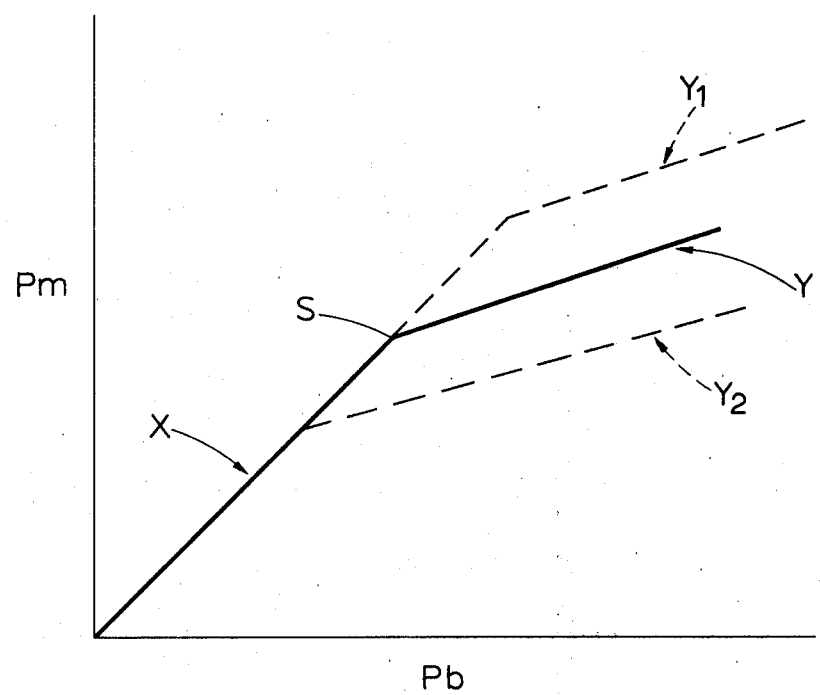

The invention will be described by way of example and with reference to the accompanying dawings in which:

FIG. 1 is a schematic drawing of a pressure modulating valve according to this invention; and FIG. 2 is a graph of brake line pressure versus master cylinder pressure.

A motor vehicle brake system pressure reducing valve, as shown in FIG. 1 of the drawings has a main piston 12 slidable in the bore 13 of a valve body (not shown). The main piston divides the bore into two chambers an inlet chamber 14 and an outlet chamber 15. The inlet chamber 14 is connected to a hydraulic master cylinder (not shown) via an inlet port 32 and the outlet chamber 15 is connected to the rear brakes via an outlet port 33 and the two chambers are interconnected by a co-axial passageway 19 through the main piston 12.

The main piston 12 has a co-axial rod 16 projecting from its inlet chamber side and which passes sealingly through an end wall of the bore 13. The rod 16 engages an end cap 17 of a control spring 18 which is arranged to bias the main piston 12 towards the outlet chamber 15. The passageway 19 has a non-return valve 21 located therein and arranged so that when the valve 21 is closed, hydraulic fluid is allowed to flow from the outlet chamber 15 to the inlet chamber 14, but not in the reverse direction.

A slave piston 22 is arranged in the valve body to be in tandem and co-axial with the main piston 12 and has a front face 23 that forms a boundary of the outlet chamber 15 and a back face 24, of the same cross-sectional area of the front face 23, that is connected via passageway 26 and solenoid valve 27 to the inlet chamber 14. The front face 23 of the slave piston 22 has a co-axial projection 25 thereon extending towards the main piston 12 and being accommodated in the bore 29 so as to operate the non-return valve 21 between its open and closed positions.

The solenoid valve 27 is normally open but when the solenoid is activated, the valve 27 closes the passageway 26, thus isolating the slave piston 22 from the inlet chamber 14. The solenoid valve is activated by a control box 28 to which it is connected. The control box 28 receives output signals from two electrical transducers, a first transducer 29 which produces an electrical signal indicative of the load on the vehicle suspension and a second transducer 31, which is sensitive to the effect of master cylinder pressure present in the input chamber 14 and produces an electrical signal indicative thereof.

The transducer 29 can be a travel transducer sensing the height of the vehicle chassis above the road wheel axles, or alternatively it could be a proximity transducer sensing, for example, the squash of a suspension rubber sensitive to the axle or wheel load. A third alternative would be for the transducer 29 to be a load cell attached to a suspension member sensing the wheel load.

The second transducer 31 is a travel transducer that senses the overall effective length of the control spring 18 which is directly related to movement of the main piston 12 and hence is related to the master cylinder pressure present in the inlet chamber 14.

The control box 28 is a comparator which measures the difference between the signals from the two transducers 29 and 31 and reacts to a predetermined difference. As an alternative a summing device that reacts to a predetermined additive total of the two signals could be utilised.

When the braking system is "at rest" the control spring 18 biases the main piston 12 back towards the slave piston 22, so that the non-return valve 21 is held open by the projection 25. When a hydraulic pressure P is generated in a hydraulic master cylinder the higher pressure is transmitted to the inlet chamber 14, through the passageway 19 and through the open valve 21 into the outlet chamber 15 and hence to the rear brakes via port 33. The pressure P also acts on the front face 23 of the slave piston and is also transmitted from the inlet chamber 14 via solenoid valve 27 and passageway 26 to act on the back face 24 of the slave piston 22.

The pressure P acts on the exposed annular area $A_1$ of the main piston 12 in the inlet chamber 14 and the exposed area $A_2$ of the main piston 12 in the outlet chamber 15. Since $A_2$ is greater than $A_1$ then the net hydraulic load on the piston 12 moves the piston 12 against the load 'L' of the spring 18.

With reference also to the graph shown in FIG. 2, as the pressure in the master cylinder increases then since the non-return 21 is open the pressure in the rear brakes also increases likewise, this is the portion X of the curve. When the pressure P increases to a point where $PA_2 - PA_1 > L$ then the main piston 12 moves rightwards against the bias of the spring 18 until:

$$PA_2 - PA_1 = L_1$$

($L_1$ is the increased load in the spring caused by its compression).

Since the slave piston 22 is also acted upon by the pressure P on both sides, 23 and 24 respectively, it is held stationary and the rightwards movement of the main piston 12, closes the non-return valve 21 isolating the rear brakes from the master cylinder pressure.

If the master cylinder pressure is slightly increased to P+dp then the slave piston 22, of say cross-sectional area 'a' will have a load of (P+dp).a on the face 24 and a load of P.a on the face 23 and, therefore, once dp.a exceeds the seal friction the slave piston will move to the right to open the valve 21. Therefore, fluid of pressure P+dp will then flow into the rear brakes system.

A further increase in master cylinder pressure to $P_2$ will cause the main piston 12 to move further to the right against the spring 18 when:

$$P_2A_2 - P_2A_1 > L_1$$

The valve 21 will then close at a point where:

$$P_2A_2 - P_2A_1 = L_2$$

($L_2$ being an increased load in the spring 18 caused by its further compression).

As before, if the master cylinder pressure is slightly increassed to $P_2+dp$ the slave piston 22 will be shuffled rightwards to re-open the valve 21 and the increased pressure $P_2+dp$ transmitted to the rear brakes. Thus the pressure to the rear brakes will increase in line with the master cylinder pressure and will move up the portion X of the curve in FIG. 2.

For a given load carried on the vehicle which is sensed by the transducer 29, there will be a pre-determined master cylinder pressure, as sensed by the transducer 31, which causes the control box 28 to activate the solenoid valve 27. The activation of the valve 27 cuts-off the master cylinder pressure to the slave piston 22 locking it in position. This is the knee joint S on the curve in FIG. 2 and is the operating point after which modulation of the rear brake pressure begins.

Once the slave piston is locked in position any further increase in master cylinder pressure to $P_3$ will cause the main piston to move rightwards when at $P_3A_2 > P_3A_1 + L_x$ ($L_x$ load in the spring) and at the point of balance $P_3A_2 = P_3A_1 + L_x$. This closes the valve 21 and isolates the rear brake pressure at $P_3$ when the master cylinder pressure is further increased to $P_4$ the main piston will shuttle back to open the valve 21 when $P_4A_1 + L_x > P_3A_2$ and fluid will flow through the valve 21 into the rear brakes until the rear brake pressure $P_b$ acting on area $A_2$ is sufficient to overcome the master cylinder pressure PM acting on area $A_1$ plus the load in the spring 18, and at the equilibrium point where the valve 21 closes. $P_bA_2 = PmA_1 + L_x$ Thus the changes in pressures in the master cylinder and the rear brakes from $P_3$ is given by:

$$P_b A_2 = Pm\, A_1 + L_x$$
$$- P_3 A_2 = P_3 A_1 + L_x$$
$$\overline{A_2 (P_b - P_3) = A_1 (Pm - P_3)}$$
$$(P_b - P_3) = (Pm - P_3)\frac{A_1}{A_2}$$

Hence once modulation begins the change in pressure in rear brakes is equal to the change in pressure in the master cylinder pressure multiplied by the ratio of the areas $A_1/A_2$. This is the portion Y of FIG. 2.

The knee points can be lowered or raised, to give curves $Y_1$ and $Y_2$ respectively, in response to changes in loads carried by the vehicle. This changing of the knee point is controlled by the control box 28 which only activates the solenoid in response to conditions set by the signal from the transducer 29 being fulfilled by the signal from the transducer 31.

$$AS_1 + BS_2 > X$$

where $S_1$ = signal from transducer 29
$S_2$ = signal from transducer 31 and A, B and X are predetermined valves.

Hence the slave piston 22 can be locked in a variety of positions, dependent upon the combination of the two transducer signals. The value of the load $L_x$ in the control spring is dependent upon at which point the slave piston 22 is locked and as the knee point relates directly to the value of $L_x$, it can be seen that the cut-off of the master cylinder pressure to the slave piston 22 controls the operating point of the pressure reducing valve.

When the brakes are released the master cylinder pressure falls in the inlet chamber 14 and the higher pressure in the outlet chamber 15 moves the main piston 12 and slave piston 22 so as to expand the rear brake system and allow the pressure Pb to fall. The pressure in outlet chamber 15 will fall until the outlet chamber hydraulic pressure on the main piston 12 is in equilibrium with the opposing master cylinder pressure in chamber 14 plus the load in the spring 18, at which point the brake pressure is greater than the master cylinder pressure so that hydraulic fluid will slowly bleed through the non-return valve 21 and the spring 18 will slowly return the main piston 12 to its 'rest' position.

Whilst the embodiment has been illustrated for a load sensitive valve, it is apparent that the transducer 29 could be an accelerometer thus allowing the valve to be inertia sensitive to changes in load on the vehicle suspension caused by changes in momentum during braking operations.

Yet another means of sensing the acceleration and deceleration of the vehicle would be for the accelerometer to sense changes in wheel speed or the vehicle prop shaft speed.

I claim:

1. A vehicle brake system pressure modulating valve having:
   a control spring;
   a body with an inlet chamber connectable to a master cylinder pressure and an outlet chamber connectable to a brake system pressure;
   a main piston to effect pressure modulation and having opposite respective faces exposed in the inlet and outlet chambers and being acted upon in one direction by the control spring and master cylinder pressure and in the other direction by the brake system pressure;
   and a control means for control of an operating point at which the main piston begins to effect pressure modulation said control means comprising:
   a slave piston connectable to master cylinder pressure;
   a valve arranged in the connection between the slave piston and the master cylinder pressure and operable to cut-off the master cylinder pressure to the slave piston;
   a first electrical signal means that produces a signal indicative of load on the vehicle;
   a second electrical signal means that produces a signal indicative of master cylinder pressure;
   and a process means for combining the two signals for consequential operation of the valve to cut-off the master cylinder pressure to the slave piston and thereby effect the operating point for pressure modulation to the brake system pressure, said operating point being controlled by the relationship between the two signals.

2. A pressure modulating valve as claimed in claim 1, having a passageway defined in the main piston and which interconnects the inlet and outlet chambers and a non-return valve which controls the flow of fluid through the passageway;
   wherein the slave piston is housed in the body in tandem with the main piston and has one face exposed to brake system pressure in the outlet chamber, said non-return valve being held open by the slave piston until the master cylinder pressure thereto to cut-off, thereby locking the slave piston in position and allowing the non-return valve to close and modulation to begin.

3. A pressure modulating valve as claimed in claim 2, wherein the second signal means is a travel transducer that senses the master cylinder pressure through movement of the main piston against the control spring bias.

4. A pressure modulating valve as claimed in claim 3, wherein the travel transducer senses changes in the length of the control spring.

5. A pressure modulating valve as claimed in claim 1 or claim 2, wherein the first signal means is a sensing means that senses the load on the vehicle suspension system.

* * * * *